(12) United States Patent
Creed et al.

(10) Patent No.: US 8,352,850 B1
(45) Date of Patent: Jan. 8, 2013

(54) DYNAMIC PARAGRAPHS

(75) Inventors: Anthony Creed, San Diego, CA (US);
Chris Quinn, San Diego, CA (US);
Kenichi Mori, Carlsbad, CA (US);
Justin C. Marr, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1481 days.

(21) Appl. No.: 11/591,423

(22) Filed: Oct. 31, 2006

(51) Int. Cl.
*G06F 17/20* (2006.01)
*G06F 17/21* (2006.01)
*G06F 17/22* (2006.01)

(52) U.S. Cl. .................. 715/221; 715/224; 715/226

(58) Field of Classification Search .................. 715/221, 715/224, 226
See application file for complete search history.

(56) References Cited

U.S. PATENT DOCUMENTS

| | | | |
|---|---|---|---|
| 6,167,523 A * | 12/2000 | Strong | 726/21 |
| 6,199,079 B1 * | 3/2001 | Gupta et al. | 715/207 |
| 7,343,551 B1 * | 3/2008 | Bourdev | 715/209 |
| 7,350,139 B1 * | 3/2008 | Simons | 715/210 |
| 7,490,135 B2 * | 2/2009 | Klug et al. | 709/217 |
| 7,603,301 B1 * | 10/2009 | Regan | 705/31 |
| 7,610,557 B2 * | 10/2009 | McLennan et al. | 715/752 |
| 7,778,895 B1 * | 8/2010 | Baxter et al. | 705/31 |
| 7,865,395 B2 * | 1/2011 | Klug et al. | 705/14.4 |
| 7,917,401 B2 * | 3/2011 | Baker | 705/26.1 |
| 2003/0036912 A1 * | 2/2003 | Sobotta et al. | 705/1 |
| 2004/0181749 A1 * | 9/2004 | Chellapilla et al. | 715/505 |
| 2006/0235764 A1 * | 10/2006 | Bamborough et al. | 705/26 |
| 2007/0156977 A1 * | 7/2007 | Ritter et al. | 711/156 |
| 2009/0043689 A1 * | 2/2009 | Yang et al. | 705/38 |
| 2011/0139868 A1 * | 6/2011 | Baker | 235/375 |
| 2011/0173560 A1 * | 7/2011 | Larcheveque et al. | 715/780 |

* cited by examiner

*Primary Examiner* — Doug Hutton, Jr.
*Assistant Examiner* — Soumya Dasgupta
(74) *Attorney, Agent, or Firm* — Osha Liang LLP (57) ABSTRACT

A method for entering input into a form involves receiving prose based on the form and a first input, receiving a request for a second input, where the request is based on the first input, submitting the second input in response to the request, where the second input contains a modification to the prose, where the second input is incorporated into the prose to obtain a summary that enables comprehension of the form.

20 Claims, 8 Drawing Sheets

DYNAMIC PARAGRAPHS

BACKGROUND

In every industry information is constantly collected for various purposes. One method of collecting information is using forms. Forms generally prompt a user for information in short non-explanatory phrases. Forms can be used to collect input related to any matter. For example, forms are used for filing taxes, for applying for licenses, for submitting medical information, and for insurance purposes. In different industries, forms may also contain industry related jargon that the user must read and comprehend in order to effectively respond to the prompts.

Electronic forms present the form and collect input from a user through a user interface such as a graphical user interface (GUI). The advantage of electronic forms is that the user can easily amend the forms by entering data and consequently editing the data while maintaining clarity of the input and output.

Typically a user first reads a form to determine which prompts are applicable and which are inapplicable. Then after reading some of the prompts the user tries to comprehend the short phrases presented in the form. Out of the multiple prompts generally present in a form the user then submits input to prompts the user decides are applicable.

In order to review the inputs submitted to the form, users reread the prompts that they responded to and read the responses they submitted to these prompts. If they find errors then they can edit the forms by erasing and reentering input.

SUMMARY

In general, in one aspect, the invention relates to a method for entering input into a form. The method comprises receiving prose based on the form and a first input, receiving a request for a second input, where the request is based on the first input, submitting the second input in response to the request, where the second input comprises a modification to the prose, where the second input is incorporated into the prose to obtain a summary, and where the summary enables comprehension of the form.

In general, in one aspect, the invention relates to a user interface for entering input into a form. The user interface comprises prose generated based on the form and a first input, a prose modifier used to modify the prose using a second input, where the prose modifier is generated based on the first input, and a summary incorporating the second input into the prose, where the summary enables user comprehension of the form.

In general, in one aspect, the invention relates to a computer readable medium. The computer readable medium comprises instructions for receiving input for a form, the instructions comprising functionality for receiving prose based on the form and a first input, receiving a request for a second input, where the request is based on the first input, submitting the second input in response to the request, where the second input comprises a modification to the prose, where the second input is incorporated into the prose to obtain a summary, and where the summary enables comprehension of the form.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and graphical user interface for entering input into a form. Specifically, embodiments of the invention allow for receiving prose and responding to requests for input based on previous input and receiving a summary of the submitted input.

A prose and request for input generated based on previous input ensures that the user is submitting input to applicable prompts and is not submitting input to inapplicable prompts. Receiving a summary of the input enables the user to comprehend the input and effectively review the input for errors.

Figure 1:
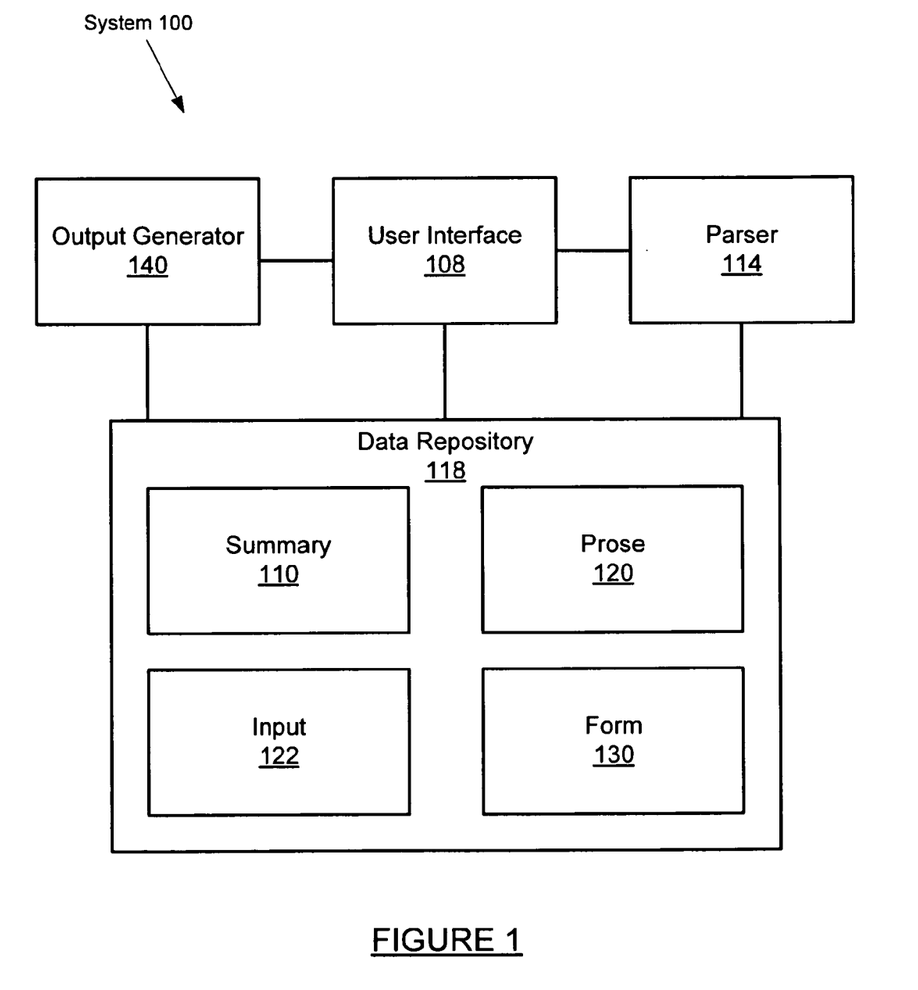
FIG. 1 shows a diagram of a system in accordance with one or more embodiments of the invention.

FIG. 1 shows a system (100) in accordance with one or more embodiments of the invention. As shown in FIG. 1, the system (100) includes a user interface (108), a parser (114), a data repository (118), an input (122), a summary (110), forms (130), prose (120), and a text generator module (140). Each of these components are described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments.

In one or more embodiments of the invention, the data repository (118) is configured to store forms (130), input (122), summary (110) and prose (120). In one or more embodiments of the invention, access to the data repository (118) is restricted. As such, access to the data repository (118) may require authentication using passwords, secret questions, personal identification numbers (PINs), and/or biometrics and/or any other suitable authentication mechanism. Those skilled in the art will appreciate that elements stored in the data repository (140) may be distributed and stored in multiple data repositories. In one or more embodiments of the invention, the data repository is implemented using a database, a hierarchical (flat) file, or any suitable data store.

In one or more embodiments of the invention, forms (130) correspond to documents that require input by a user or by way of a machine. Examples of forms (130) include but are not limited to a tax form, a travel planning form, a personal information form, a medical form, a license form, an order form, an evaluation form, and a permit form.

In one or more embodiments of the invention, input (122) corresponds to any input collected from a user or program. Input (122) may include but is not limited to text entered into a field, a selection made from multiple choices, and a file that is submitted by the user. Examples of input (122) may include but are not limited to personal information, financial information, career information, and travel information.

In one or more embodiments of the invention, summary (110) corresponds to a summary of the input (122). In one or more embodiments of the invention, a summary (110) may be in paragraph format, bulleted format, in graphical format, or any other suitable format. A summary (110) may include all of the information submitted by a user or a selection of the information submitted by the user. A summary (110) may be updated after receiving each input (122) from a user or may be updated after receiving a subgroup of inputs (122) from a user. In one or more embodiments of the invention, a summary (110) corresponds to a summary of the input (122) and at least a portion of the form (130). For example, a summary may combine information from the form (130) and the input (122). A summary (110) may be stored on the data repository (118) or generated dynamically at runtime. In one or more embodiments of the invention the summary (110) is a narrative. A narrative may include but is not limited to any form of text describing a sequence of events caused, experienced, or associated with a user.

In one example, input (122) may include travel plans for a user such as the destination, the number of nights, the type of bed and the amenities required. In one example, summary (110) of the input (122) may include only the destination. Alternatively in another example, summary (110) may include all the details of the input (122) in paragraph format.

In one or more embodiments of the invention, the data repository (118) stores prose (120). Prose (120) may correspond to a request for input (122) from a user that follows the summary (110). In one or more embodiments of the invention, prose (120) is a continuation of a narrative that is written as information is entered. Examples of prose (120) include but are not limited to an incomplete sentence, a complete sentence, a graphical image, and a question. Prose (120) may be stored on the data repository (118) and/or generated dynamically at runtime.

Continuing with FIG. 1, in one or more embodiments of the invention, the output generator (140) is configured to generate output to be displayed in the user interface (108). In one or more embodiments of the invention, the output generator may generate the summary (110), and prose (120). The output generator may also generate a prose modifier (shown in FIG. 2, prose modifier 222) that may receive input from a user. The output generator may use one or more of the summary (110), prose (120), input (122) and form (130) stored in data repository (118) to generate the output for display in the user interface (108). In one or more embodiments of the invention, the output generator (140) uses input (122) and form (130) to determine what, if any further input is required. Based on this determination the output generator (140) may generate the summary (110), prose (120) and prose modifier (shown in FIG. 2, prose modifier 222). In one or more embodiments of the invention, the output generator (140) uses the data repository (118) to relate/link the data stored in the data repository (119) to the user interface (108).

Consider the following example, which in no way is intended to limit the invention. If the user is submitting information for a tax form and has indicated in an input (122) that he has one dependant spouse and no children, the output generator (140) may generate a summary (110) including "I have one dependant spouse." Then the output generator may generate prose (120) including "My dependant spouse's name is . . . ." The prose (120) may be followed by a blank entry field (i.e., prose modifier 222 shown in FIG. 2) to allow the user to enter the spouse's name to modify the prose (120).

In another example, if the user has indicated in the previous input (122) that he has no spouse and one dependant child, the output generator (108) may generate a summary (110) comprising of "I have one dependant child." Then the output generator (108) may generate prose (120) including "My child's gender and name are . . . " This may be followed by a prose modifier (prose modifier 222 shown in FIG. 2) such as a radio button with the choices "Male" and "Female" and a second prose modifier (prose modifier 222 shown in FIG. 2) such as a blank entry field to enter the name of the child.

Continuing with FIG. 1, in one or more embodiments of the invention, the user interface (108) is configured to display output to a user and receive input from a user. In or more embodiments of the invention, user interface (108) is a graphical user interface (GUI) that uses a display device to display output to a user. A user interface (108) may receive input (122) from a user through a keyboard, mouse or any other device that allows a user to submit input (122). Specific components of the user interface (108) are shown in FIG. 2.

In one or more embodiments of the invention, the parser (114) is configured to receive input from a user interface (108) and submit the input (122) to the data repository (118). In one or more embodiments of the invention, the parser (114) is a program that analyzes an input sequence to determine its grammatical structure with respect to a predetermined grammatical structure. A parser (114) may parse through user input, select a subgroup of input or analyze input, and submit the input to the data repository (118).

Figure 2:
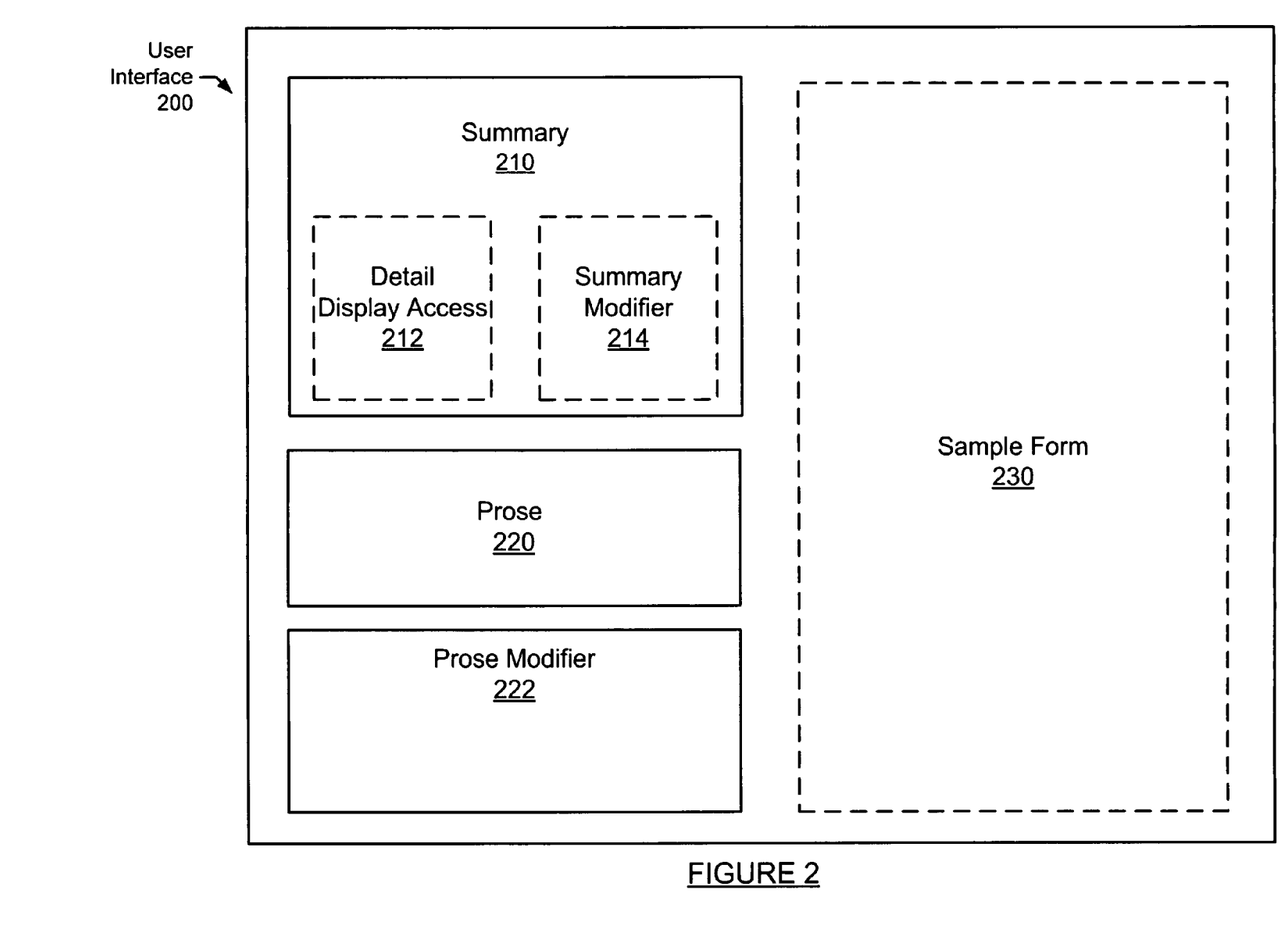
FIG. 2 shows an interface in accordance with one or more embodiments of the invention.

FIG. 2 shows a user interface (200) in accordance with one or more embodiments of the invention that includes a summary (210), a detail display (212), a summary modifier (214), a prose (220), a prose modifier (222), and a sample form (230). In one or more embodiments of the invention the user interface (200) may be a graphical user interface (GUI). The user interface (200) is essentially the same as user interface (108) from FIG. 1.

In one or more embodiments of the invention, summary (210) is displayed to enable user comprehension. Summary (210) is essentially the same as summary (110) shown in FIG. 1. In one or more embodiments of the invention, since summary (210) is based on prior input and a form. In one or more embodiments of the invention summary (110) is displayed before the prose (220) and the prose modifier (222) which are used for further input.

In one or more embodiments of the invention, a summary modifier (214) is any component or tool within the user interface (200) that allows a user to edit the information associated with the summary (210). In one or more embodiments of the invention, the summary modifier (214) may be accessed by clicking on the summary (210), by clicking a summary modifier icon, or by any other suitable method. In one or more embodiments of the invention, a user can click on the summary modifier (214) such as underlined text within summary (210) to directly type in changes to the summary (210). In another embodiment of the invention, the user can link to another window by selecting summary modifier (214) in order to modify the summary (210) in the second window.

Continuing with FIG. 2, in one or more embodiments of the invention, details associated with the summary (210) can be accessed through the detail display (212). For example, the detail display (212) may be accessed by hovering over the summary (210) with a mouse, by clicking on the summary (210) to hyperlink to a detail display (212) of the summary (210) in another window or by selecting the summary (210) via a keyboard. In one or more embodiments of the invention, the detail display (212) is used to modify the details associated with the summary. Examples of a detail display (212) include but are not limited to showing all of the financial accounts associated with a total savings shown in the summary (210), and showing the full address of a user associated with a city & state of the user shown in the summary (210).

In one or more embodiments of the invention, prose (220) is displayed in the user interface (200). Prose (220) is essentially the same as prose (120) shown in FIG. 1. In one or more embodiments of the invention, the prose (220) follows the summary (210) both visually and logically. Prose (220) maybe a continuation of the summary (210) and therefore may also be presented in a narrative format visually following the summary (210).

In one or more embodiments of the invention, a prose modifier (222) is used to modify the prose (220). A prose modifier (222) includes at least one input field (224) or selector (226) to modify the prose (220). In one or more embodiments of the invention, an input field (224) is any field that can accept an entry from a user, an application or a file. In one or more embodiments of the invention, a selector (226) is any input request in which the user may select from a predetermined set of choices. Examples of selectors (226) include radio buttons, check boxes, selection from a set, and other controls well known in the art.

In one or more embodiments of the invention, sample form (230) shows a preview of a form that the input is needed for. A sample form (230) may show portions of the form or the entire form. In one more embodiments of the invention the sample form (230) maybe populated with input associated with the form.

In one or more embodiments of the invention, a general help may be available corresponding to an implementation of the invention. In one or more embodiments of the invention a specific help may be available for one or more fields within the user interface (200).

Figure 3:
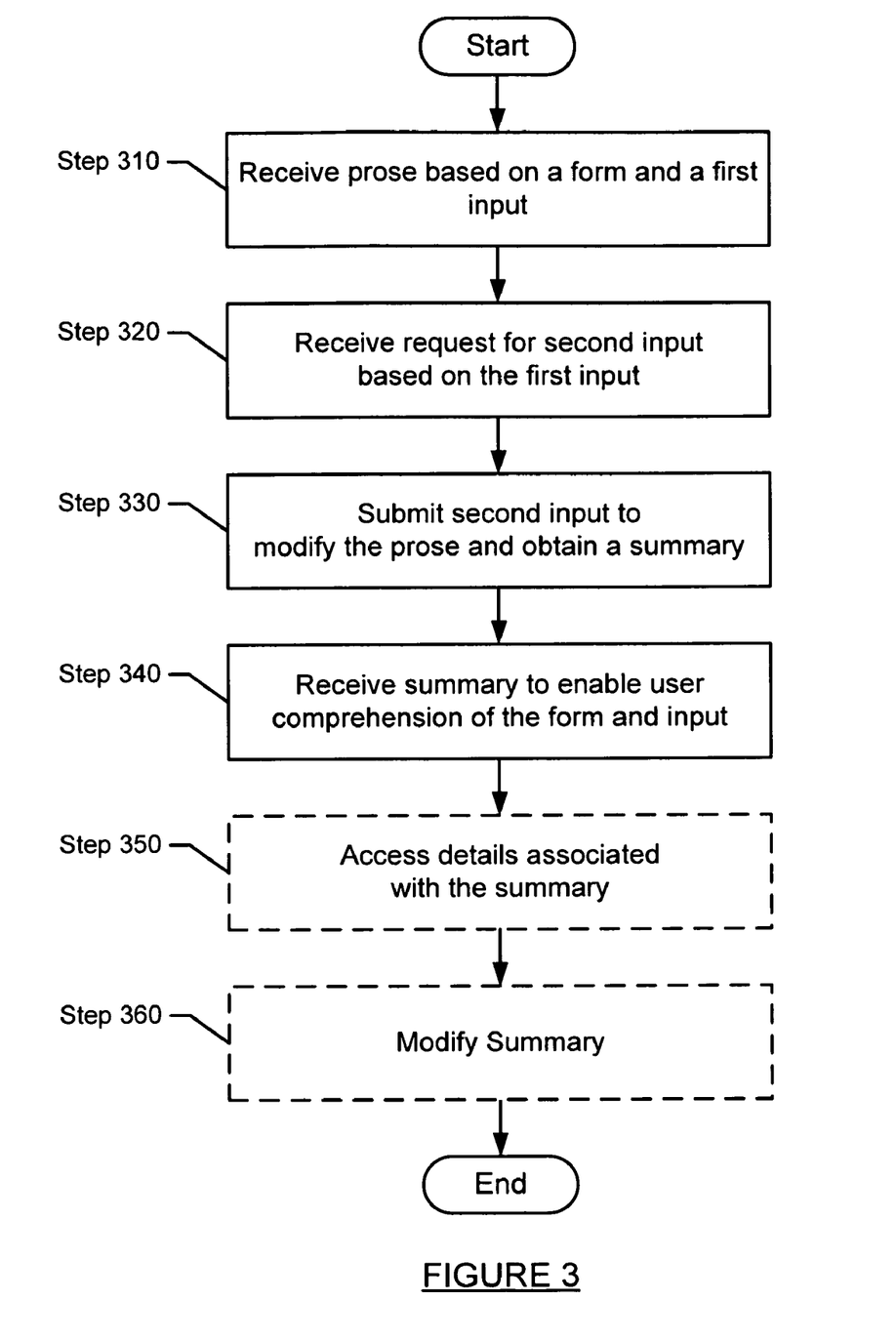
FIG. 3 shows a flow chart in accordance with one or more embodiments of the invention.

FIG. 3 shows a flowchart in accordance with one or more embodiments of the invention. In STEP 310, a prose is received based on a form and a first input. The first input may be any previous input entered by a user. The prose is essentially the same as prose (120) shown in FIG. 1. In one or more embodiments of the invention the prose may be received through a display on a display device.

In STEP 320, the user receives a request for a second input. The request for the second input prompts the user for a modification to the prose. In one or more embodiments of the invention, the input request includes at least one input field or selector. In one or more embodiments of the invention, an input field may be any field that is used by a user to enter input, and a selector may be any component which allows a user to make a selection from multiple choices.

In STEP 330, the user submits the second input to modify the prose and obtain a summary. An example of a second input may be a modification to a prose by completion of an incomplete sentence. In one or more embodiments of the invention, the prose is a short prompt and the modification to the prose is a response to the prompt. For example, the prose may comprise of "Bank Name." The modification may be the input "Bank A" into an empty field. The summary is essentially the same as summary (110) described in FIG. 1. For example, if the prose comprises of "Bank Name" and the second input or modification comprises of "Bank A," the summary may state: "My bank is Bank A." In one or more embodiments of the invention, the summary is generated in paragraph format. In one or more embodiments of the invention, the summary is modified with some user input. In another embodiment of the invention a summary is generated upon completion of all user input.

In STEP 340, the summary is received to enable user comprehension of the form and the input. In one or more embodiments of the invention, the summary enables the user to read previous input in a narrative paragraph format. This review method may actively engage the user, increase interest and thereby reduce errors in input. Reviewing input in a narrative paragraph format may reduce skimming behavior by a user which leads to inaccuracy.

In STEP 350, the user accesses details associated with the summary. In one or more embodiments of the invention a summary shows part of the information entered by the user. A user can access details not shown in the summary by hovering over the summary or selecting the summary to generate a detail display. For example, a summary may indicate the city and state of a user's address and a detail display may show the complete address of the user.

In STEP 360, the user modifies the summary to correct any incorrect information or to submit any missing information. The user may also delete any information from the summary. In one or more embodiments of the invention, the user can modify the summary directly by clicking on the summary and editing the submitted information. In an alternate embodiment of the invention, the summary can be modified in a second window. In one or more embodiments of the invention the details associated with the summary may be accessed and modified, and a new summary incorporating the modifications may be generated.

Figure 4:
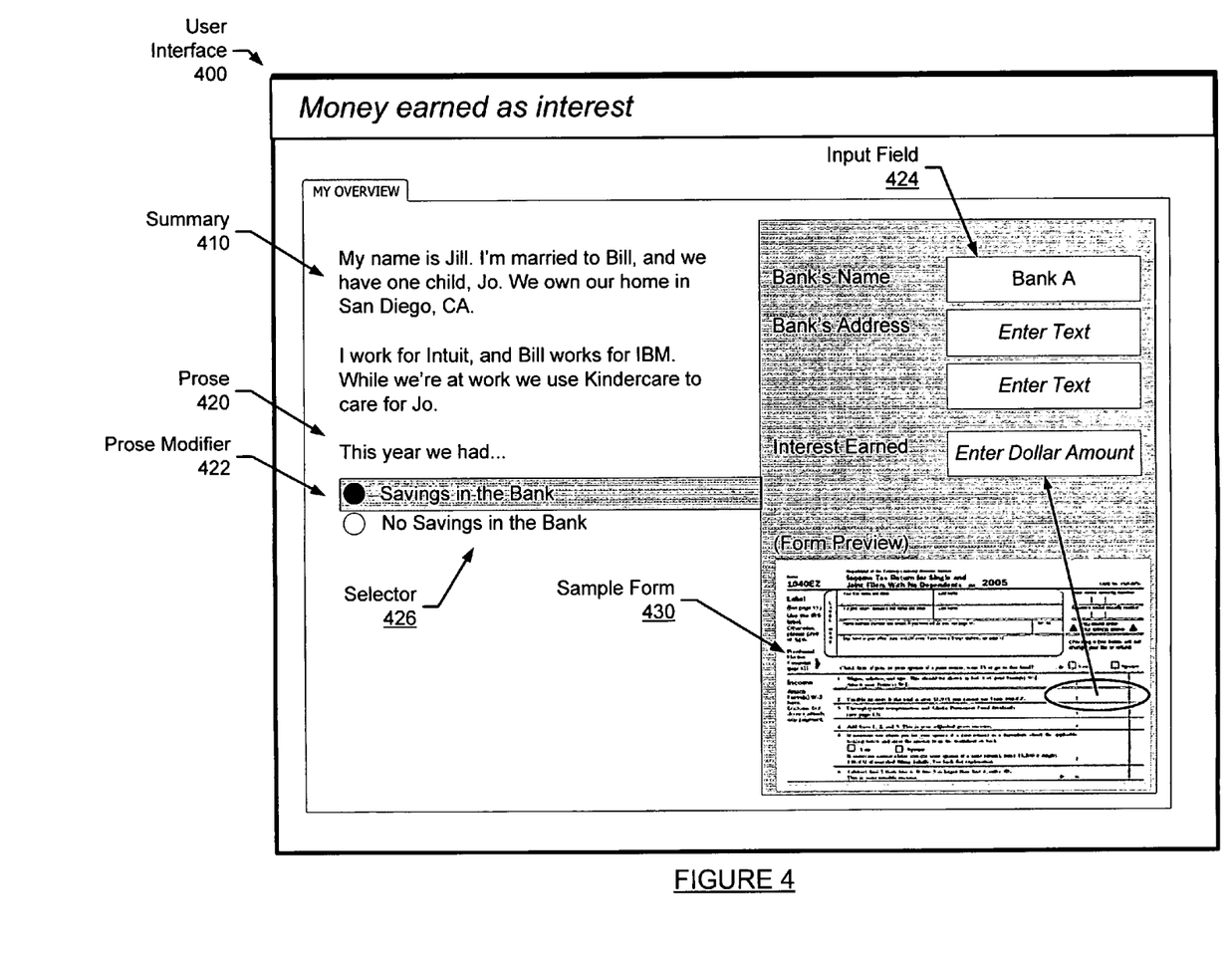
FIGS. 4-7 show examples of an interface in accordance with one or more embodiments of the invention.

FIG. 4 shows an example of a user interface (400) in accordance with one or more embodiments of the invention. This example is in no way intended to limit the invention. User interface (400) is a graphical user interface that is being used by a user to enter tax information into a 1040EZ tax form.

In one or more embodiments of the invention, Summary (410) summarizes the input in paragraph format for user review and comprehension. Summary (410) is modified continually, incorporating every input the user enters. In this example, Summary (410) provides the user's personal information including spouse name, child name, residence type, city, employment information and child care information. The summary (410) provides a user with a brief summary of input and enables the user to comprehend, review, and correct the input. The user is able to observe an alternate view of the information submitted and presents the information submitted in an easy to read format. The user is also able to continually review input as it is entered into the form. The narrative may engage the user's interest by providing feedback on input that has been entered.

Prose (420) is a continuation of the narrative prompting the user to use the prose modifier (422) to modify the prose (420). The prose (420) is an incomplete sentence that can be completed by using the prose modifier (422). In this example, the prose (420) and the prose modifier (422) continue building the user's financial profile by collecting input corresponding to the user's savings. Selector (420) is used for indicating whether the user has savings in the bank. The user is indicating that there are "Savings in the Bank" using the selector (426). Based on this input, further prompts are generated corresponding to the specific information regarding user savings requesting user input. For example, the input field (424) may be used by the user to enter the bank name.

Continuing with FIG. 4, sample form (430) may be displayed in the user interface (400). The sample form (430) may be a preview of the form to which the user is submitting input.

In one or more embodiments of the invention, the sample form (430) is populated with input while being entered by the user.

Figure 5:
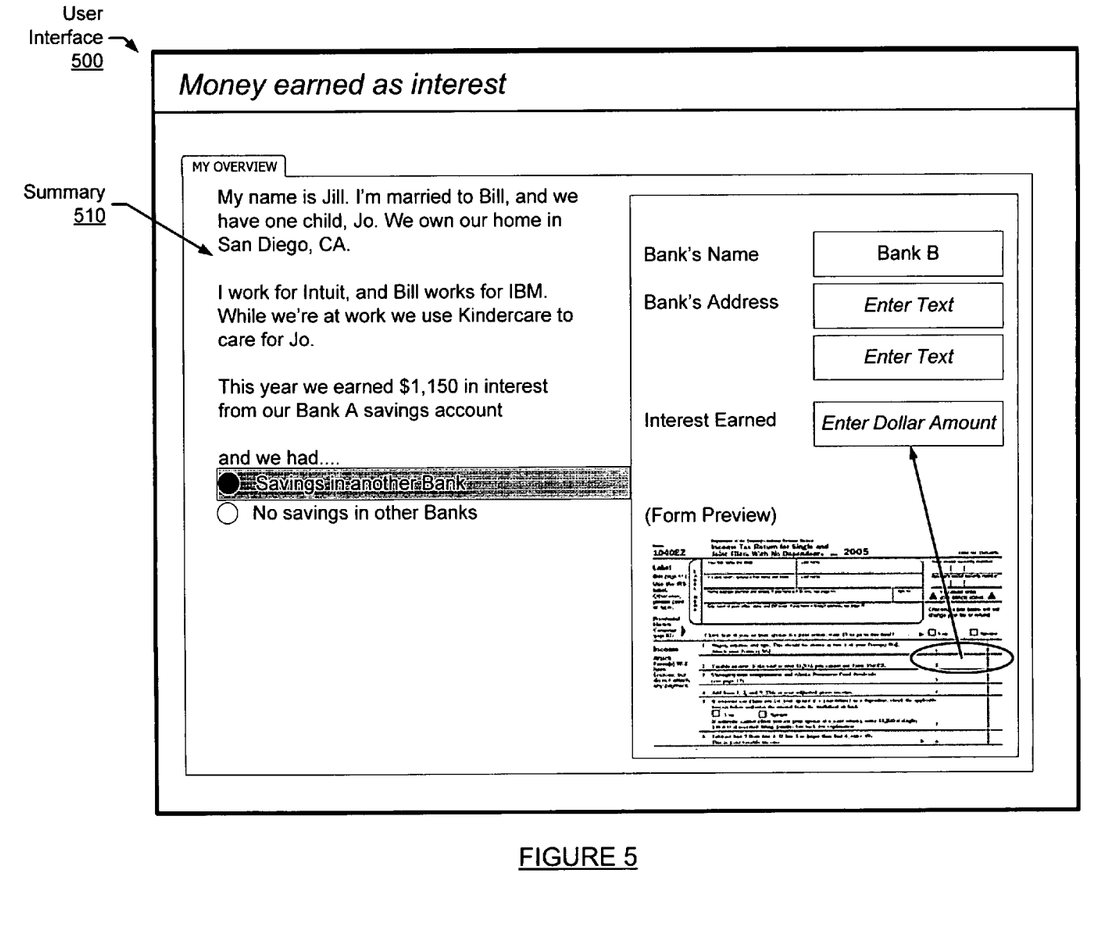

FIG. 5 is an example of a user interface (500) in accordance with one or more embodiments of the invention. This example is in no way intended to limit the invention. User interface (500) is a progression of user interface (400) demonstrating one or more embodiments of the invention. User input shown in FIG. 4 is incorporated into the summary (510). For example, user entered input including the amount of interest earned from savings in Bank A, and Bank A address. The summary (510) indicates that "this year we earned $1,150 in interest from our Bank A savings account." Summary (510) does not include the bank address. Detail information such as a bank address can be accessed as shown in FIG. 6.

Figure 6:
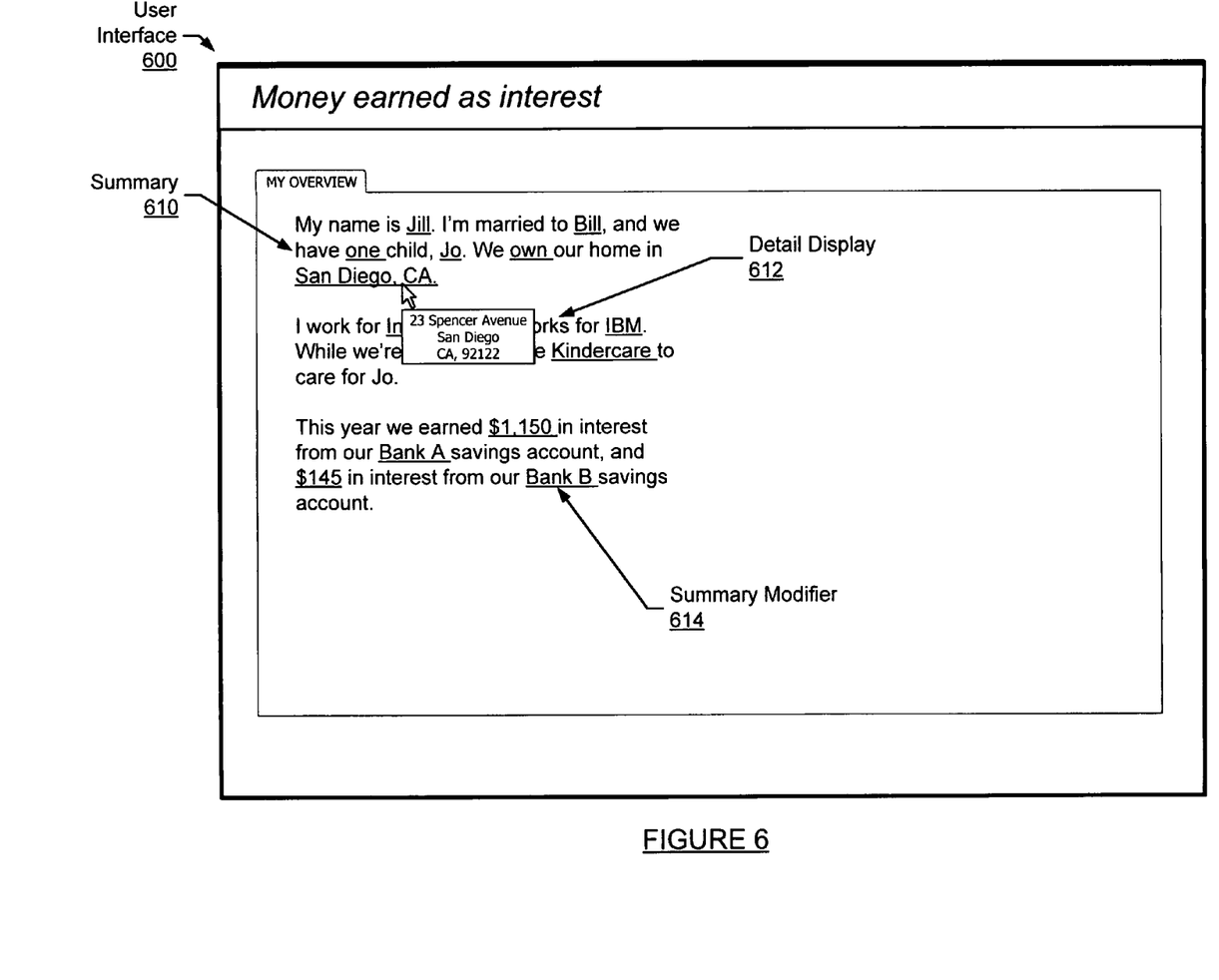

FIG. 6 is an example of a user interface (600) in accordance with one or more embodiments of the invention. This example is in no way intended to limit the invention. User interface (600) includes a summary (610), a detail display (612), and a summary modifier (614). Summary (610) is a summary of the information entered by the user. Detail display (612) allows a user to view the details associated with the summary (610). Summary (610) indicates that the user has a residence in "San Diego, Calif." Detail display (612) provides the details (i.e., complete address) of the residence and is activated by hovering over the summary information. Summary modifier (614) is essentially the same as summary modifier (214). Summary modifier (614) can be activated by selecting the summary information to be modified and thereafter modifying the selected information. In this example, the summary information "Bank B" is underlined to demonstrate that it can be modified. Selecting the modifiable information can allow a user to directly modify the summary or generate a second window with modification capabilities.

Figure 7:
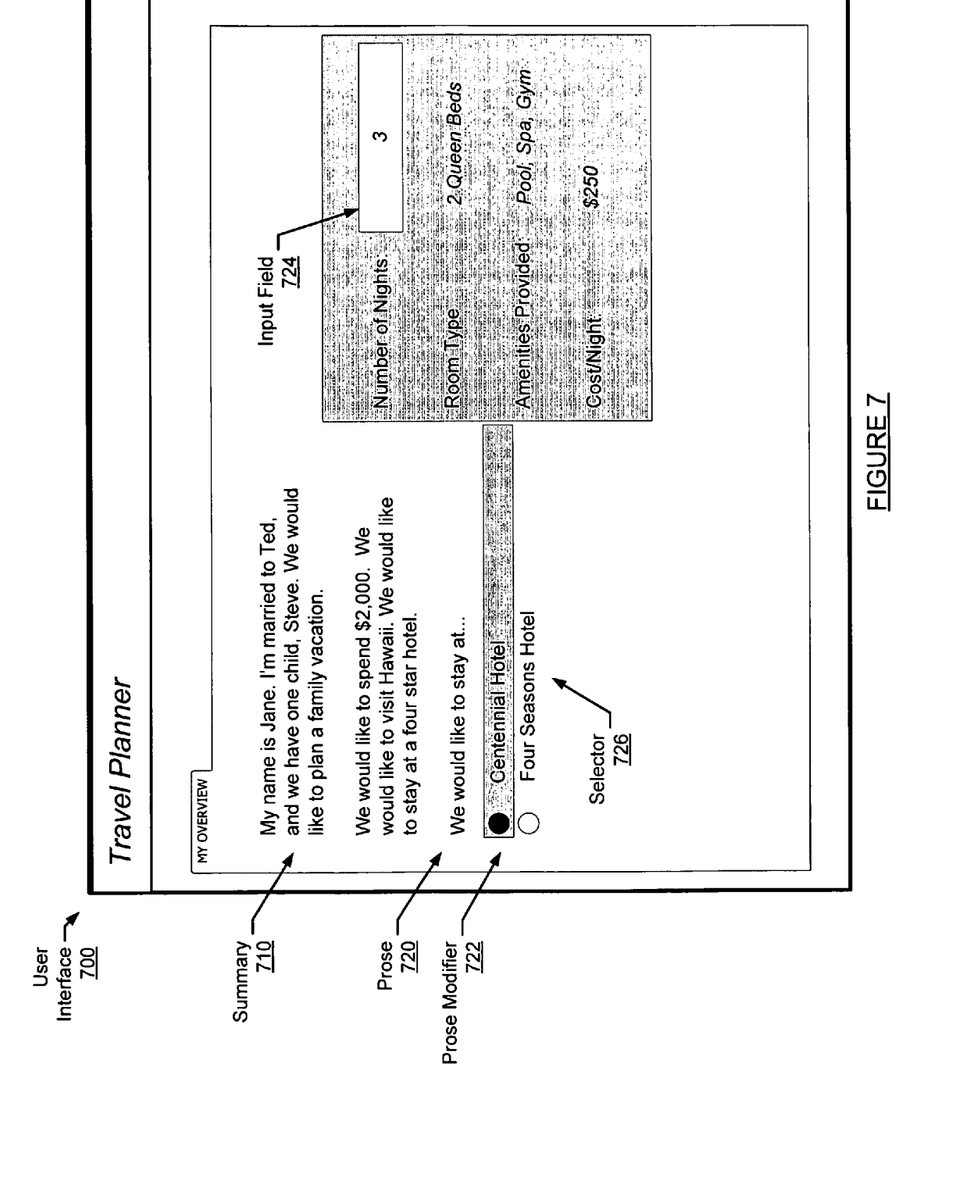

FIG. 7 is an example of a user interface (700) in accordance with one or more embodiments of the system. This example is in no way intended to limit the invention. Summary (710) summarizes the input in a narrative paragraph format for user review and comprehension. Prose (720) is a continuation of the narrative prompting the user to use the Prose Modifier (722) to modify the Prose (720). The Prose Modifier (722) is a combination of a Selector (720) and one Input Field (724). The Selector (726) is a radio button selection that the user can make. The Input Field (724) allows the user to enter an alphanumeric input.

Figure 8:
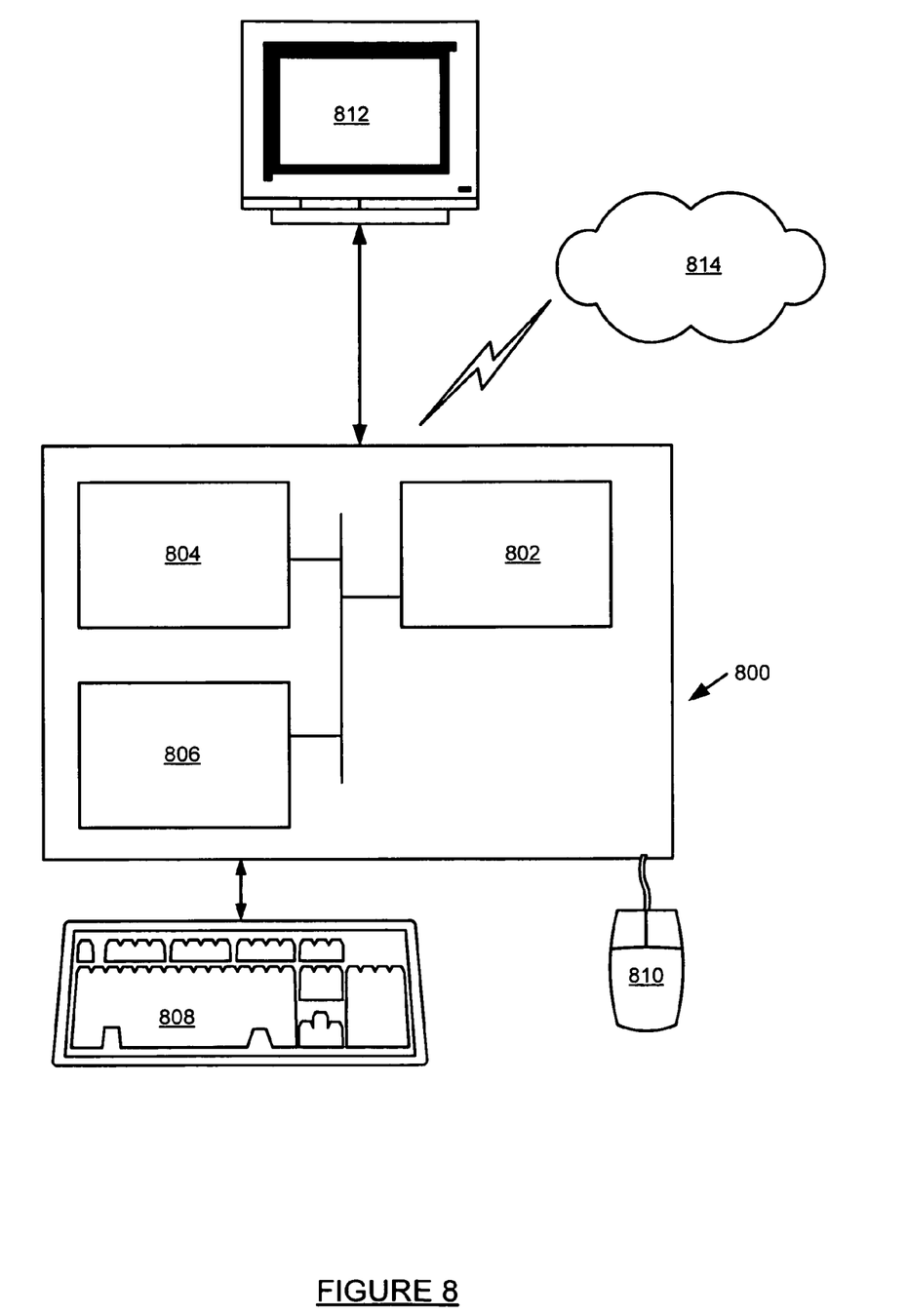
FIG. 8 shows a computer system in accordance with one or more embodiments of the invention.

The invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) is connected to a LAN or a WAN (e.g., the Internet) (814) via a network interface connection. Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention (e.g., object store layer, communication layer, simulation logic layer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for entering input into a tax form comprising:
displaying, using a processor interacting with a display device, a first prompt on the display device corresponding to the tax form;
receiving, using the processor and in response to the first prompt, a first input comprising a name of a financial institution;
generating, by the processor, prose based on the tax form and the first input, wherein the prose is an incomplete sentence within a summary displayed in a user interface comprising a preview of the tax form;
displaying, using the processor interacting with the display device, the prose as a second prompt on the display device corresponding to the tax form;
receiving, using the processor, a second input in response to the second prompt, wherein the second input completes the incomplete sentence of the prose;
creating, using the processor, a complete sentence formed using the incomplete sentence of the prose and the second input; and
updating, using the processor, the summary displayed in the user interface comprising the preview of the tax form to include the complete sentence,
wherein the complete sentence comprises the name of the financial institution, and
wherein the summary enables comprehension of the tax form.

2. The method of claim 1, wherein the summary is a narrative.

3. The method of claim 1, further comprising:
displaying, using the processor, details associated with the summary.

4. The method of claim 1, further comprising:
storing, using the processor, the summary in a data repository;
displaying, using the processor interacting with the display device, a third prompt for a third input on the display device;
receiving, using the processor, a third input in response to the third prompt,
modifying, using the processor, the summary by incorporating the third input into the summary to obtain a modified summary; and
storing, using the processor, the modified summary in the data repository.

5. The method of claim 1, wherein the first input is at least one selected from a group consisting of a selection by the user, a prose entry by the user, and a numeric entry by the user.

6. The method of claim 1, further comprising:
generating, using the processor, the tax form, wherein the first input is incorporated into the tax form.

7. The method of claim 1, further comprising:
  displaying, using the processor interacting with the display device, a preview of the tax form on the display device.

8. A system for entering input into a tax form comprising:
  at least one processor;
  a storage device configured to store the tax form;
  a display device interacting with the at least one processor; and
  a memory coupled to the at least one processor and the display device, wherein the memory comprises executable instructions to:
    display, on the display device, a first prompt corresponding to the tax form;
    receive, in response to the first prompt, a first input comprising a name of a financial institution;
    generate a prose based on the tax form and the first input, wherein the prose is an incomplete sentence within a summary displayed in a user interface comprising a preview of the tax form;
    display, on the display device, the prose as a second prompt corresponding to the tax form;
    receive, in response to the second prompt, a second input, wherein the second input completes the incomplete sentence of the prose;
    create a complete sentence formed using the incomplete sentence of the prose and second input; and
    update the summary displayed in the user interface comprising the preview of the tax form to include the complete sentence,
    wherein the complete sentence comprises the name of the financial institution, and
    wherein the summary enables user comprehension of the tax form.

9. The system of claim 8, wherein the summary is a narrative.

10. The system of claim 8, wherein the memory further comprises executable instructions to:
  display, on the display device, the summary.

11. The system of claim 8, wherein the memory further comprises executable instructions to:
  display a third prompt for a third input on the display device;
  receive a third input in response to the third prompt; and
  modify the summary by incorporating the third input into the summary to obtain a modified summary.

12. The system of claim 8, wherein the second prompt is at least one selected from a group consisting of a selector used by a user to modify the prose and an input field used by the user to modify the prose.

13. The system of claim 8, wherein the preview incorporates the first input.

14. The system of claim 8, wherein the system comprises at least one from a group consisting of a mobile device, a television, a kiosk, and a desktop PC.

15. A non-transitory computer readable medium comprising instructions for receiving input for a tax form, the instructions comprising functionality for:
  displaying a first prompt corresponding to the tax form;
  receiving, in response to the first prompt, a first input comprising a name of a financial institution;
  generating prose based on the tax form and the first input, wherein the prose is an incomplete sentence within a summary displayed in a user interface comprising a preview of the tax form;
  displaying the prose as a second prompt corresponding to the tax form;
  receiving a second input in response to the second prompt, wherein the second input completes the incomplete sentence of the prose;
  creating a complete sentence formed using the incomplete sentence of the prose and second input; and
  updating the summary displayed in the user interface comprising the preview of the tax form to include the complete sentence,
  wherein the complete sentence comprises the name of the financial institution, and
  wherein the summary enables comprehension of the tax form.

16. The computer readable medium of claim 15, wherein the summary is a narrative.

17. The computer readable medium of claim 15, wherein the instructions further comprising functionality for:
  displaying details associated with the summary.

18. The computer readable medium of claim 15, wherein the instructions further comprising functionality for:
  storing the summary in a data repository;
  displaying a third prompt for a third input;
  receiving a third input in response to the third prompt;
  modifying the summary by incorporating the third input into the summary to obtain a modified summary; and
  storing the modified summary in the data repository.

19. The computer readable medium of claim 15, wherein the first input is at least one selected from a group consisting of a selection by the user, a prose entry by the user, and a numeric entry by the user.

20. The computer readable medium of claim 15, wherein the instructions further comprising functionality for:
  generating the tax form, wherein the first input is incorporated into the tax form.

* * * * *